C. H. ELLIS.
BALL COCK.
APPLICATION FILED SEPT. 19, 1911.
1,041,257.
Patented Oct. 15, 1912.
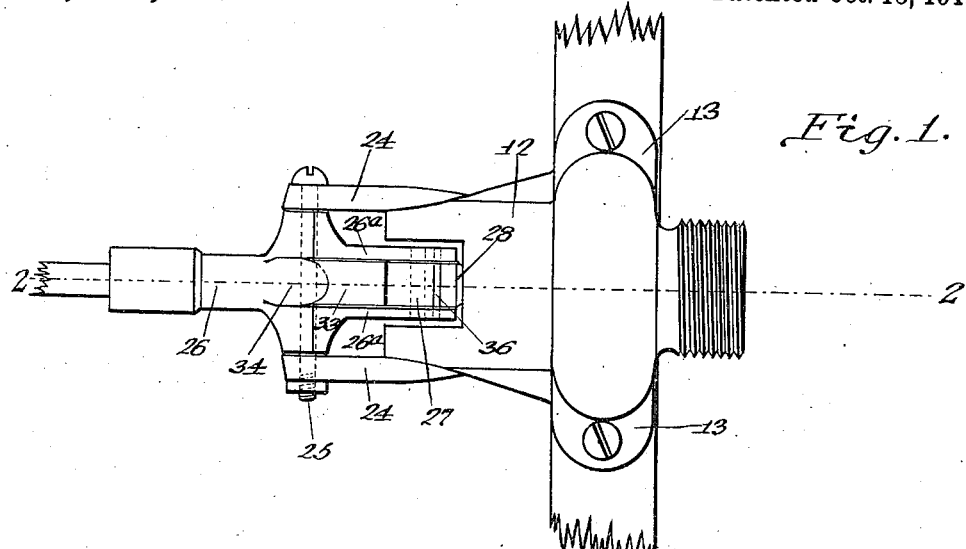
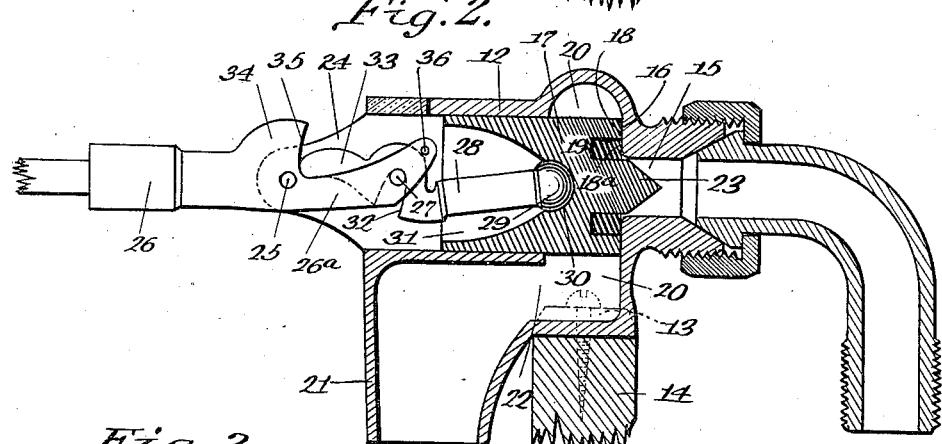
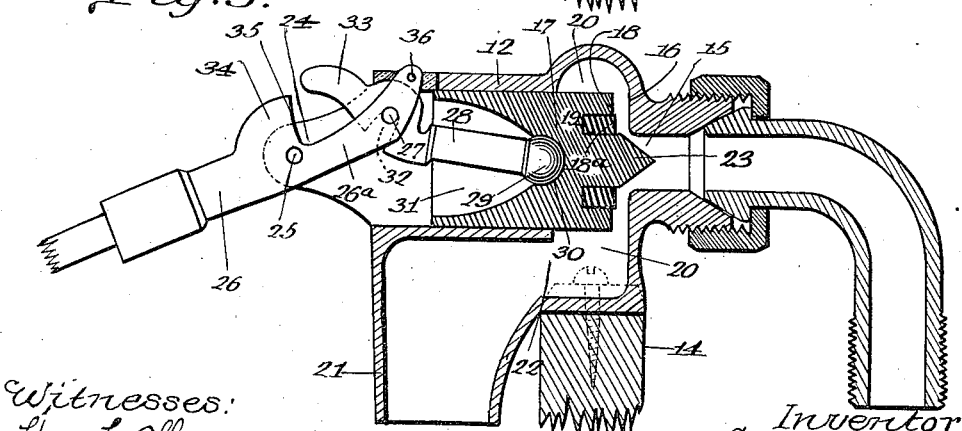
Witnesses:
Harry L. Allen
Inventor:
Charles H. Ellis
by Wright, Brown, Quinby & Hay
Attys.

UNITED STATES PATENT OFFICE.

CHARLES H. ELLIS, OF BOSTON, MASSACHUSETTS.

BALL-COCK.

1,041,257.  Specification of Letters Patent.  Patented Oct. 15, 1912.

Application filed September 19, 1911. Serial No. 650,106.

*To all whom it may concern:*

Be it known that I, CHARLES H. ELLIS, a citizen of the United States, and a resident of Boston, in the county of Suffolk and State of Massachusetts, have invented certain new and useful Improvements in Ball-Cocks, of which the following is a specification.

This invention relates to ball cocks for controlling the admission of water to a flushing tank, and has for its object to provide a ball cock which shall be practically noiseless in operation and is adapted to operate accurately in letting on and shutting off water without liability to leakage after long continued use.

The invention consists in the improvements which I will now proceed to describe and claim.

Of the accompanying drawings:—Figure 1 represents a top plan view of a ball cock embodying my invention: Fig. 2 represents a longitudinal section on line 2—2 of Fig. 1, showing the cock valve closed: Fig. 3 represents a section similar to Fig. 2, showing the cock valve open.

The same reference characters indicate the same parts in all the figures.

In the drawings,—12 represents the cock casing which is provided with ears 13 adapted to be attached to the wall 14 of a flushing tank. The casing is provided with a valve chamber which comprises a cylindrical portion and is open at one end, and is provided at the other end with an inlet 15 surrounded by a flat annular valve seat 16 forming the inner end of the valve chamber.

17 represents a cylindrical plunger valve which has a sliding fit in the valve chamber and has an inner end face adapted to abut against the seat 16. Said inner face is composed of two annular portions 18 and 18$^a$, one of which is a metallic face formed on the valve body, while the other is the outer end of an annular elastic rubber packing ring or washer inserted in an annular groove or recess 19 formed in the inner end of the valve. The washer is formed so that its outer end normally projects slightly beyond the end of the valve and is compressed by pressure of the valve against the seat 16. The rigid annular face 18 is flat and of substantial width so that it has a relatively wide bearing on the valve seat. When the portion 18 abuts against the seat, the washer is under compression, its compression being positively limited, however, by the bearing of the portion 18 on the valve seat, so that there is no possibility of injurious compression of the washer. The rigid portion 18 of the valve face is formed to accurately fit the portion of the valve seat against which it bears so that only the most minute crevice exists between said portion and the valve seat when the valve is closed. The only duty required of the elastic washer is, therefore, to prevent the possibility of the slight leakage which might otherwise occur between the portion 10 and the valve seat, or, in other words, to pack the joint between the rigid faces of the valve and seat, hence, the washer requires very little compression and may be made of very elastic rubber adapted to retain its elasticity for a protracted length of time. The valve thus constructed is at once efficient and durable.

The casing 12 is provided with an enlargement at its inner end containing a passage 20 which surrounds the inner end portion of the valve and communicates with the inlet 15 when the valve is open. Said passage preferably increases gradually in width from the upper to the lower side of the casing, as indicated by Figs. 2 and 3, the lower portion of the passage being considerably wider or having a greater cross sectional area that the upper portion.

21 represents a downwardly projecting outlet nozzle formed on the outer portion of the casing and communicating with the passage 20 at 22, the passage through said nozzle being of greater conducting capacity than that of the inlet 15. The nozzle 21 is arranged to discharge water into the tank. The conducting capacity of the curved passage 20 is also greater than that of the inlet 15, so that when the valve is open the passage 20 and nozzle 21 constitute a conduit, the conducting capacity of which is greater than that of the inlet 15. Said conduit is immediately filled with water by the spreading of the stream flowing through the inlet. The movement of the water in contact with the walls of the conduit is retarded by friction, this being surplus water in excess of the volume of the active stream determined by the size of the inlet. The retarded water constitutes a slowly moving surface stream or cushion which surrounds the said active stream and renders the discharge practically noiseless. The movement of the surplus water is retarded also by atmospheric pressure which permits the unretarded escape of only a stream determined by the inlet. The gradual increase in the capacity of the passage 20 from the top downwardly facilitates the spreading of the stream and affords a large area of retarding surface in contact with the exterior of the stream.

The casing 12 is provided at its outer end with two outwardly projecting ears 24 separated by a space which receives the shorter arm of a float lever which is fulcrumed on a stud 25 inserted in said ears. The float lever includes a longer arm 26 which projects over the flushing tank and is provided with a suitable float (not shown) and a bifurcated shorter arm, the branches 26ª of which project between the ears 24 and are separated by a space across which extends a stud 27 attached to said branches.

28 represents a strut having a semi-spherical inner end seated in an outwardly facing semi-spherical socket 30 formed at the inner end of a recess 31 in the outer end portion of the valve 17. The outer end portion 33 of the strut extends between the lever branches 26ª and has a tapering recess 32, the inner end of which is adapted to rock on the stud 27.

The float lever is provided with a projection 34 immediately over its fulcrum, said projection having a cam shaped face or abutment 35, the inner end of which is in close proximity to the fulcrum. When the water falls in the tank, the shorter arm of the float lever is raised and the stud 27 bearing on the inner end of the recess 32 raises the outer end portion of the strut from the abutment 35 so that the valve is permitted to open, as shown by Fig. 3. When the water rises in the tank, the shorter arm of the float lever is depressed and the outer end portion of the strut is correspondingly depressed until it bears on the inner portion of the abutment 35. During the first part of the depression of the shorter arm the stud 27 pressing against one side of the recess 32, exerts an initial valve-closing pressure on the strut unaided by the abutment 35, the cam shape of the latter preventing its contact with the strut until the valve is nearly closed and the pressure of the water against the valve has considerably increased. The final or closing pressure on the valve is caused by the bearing of the abutment 35 on the strut and is much stronger than that caused by the bearing of the stud 27 on the wall of the recess 32, owing to the close proximity of the acting inner portion of the abutment to the fulcrum of the float lever. This final pressure is sufficient to overcome the water pressure at the inlet and compress the elastic washer in the valve, and occurs during a relatively slight upward movement of the longer arm of the float lever. The branches of the shorter arm of the float lever are provided with a retaining pin 36, which prevents the strut from moving upwardly out of the space between said branches, as indicated by Fig. 3. The bearing of the abutment 35 on the strut prevents any possibility of leakage between the valve and its seat, which might be caused by wear of the stud 27 and the portion of the strut in contact therewith.

I claim:

1. A ball cock comprising a casing having a valve chamber, an inlet at the inner end of the chamber, a valve seat surrounding the inlet, an outlet communicating with the inner portion of the valve chamber, a plunger valve movable in the chamber and having a valve face at its inner end adapted to abut against said seat, and an outwardly facing centrally located socket, a float lever fulcrumed on the casing, and a strut seated at its inner end in said socket, said float lever and strut having complemental means for moving the strut from the valve seat to permit the valve to open, and for successively exerting initial and final valve-closing pressures on the strut.

2. A ball cock comprising a casing having a valve chamber, an inlet at the inner end of the chamber, a valve seat surrounding the inlet, an outlet communicating with the inner portion of the valve chamber, a plunger valve movable in the chamber and having a valve face at its inner end adapted to abut against said seat, and an outwardly facing centrally located socket, a float lever fulcrumed on the casing and having longer and shorter arms and an abutment between said arms in close proximity to the fulcrum, a strut seated at its inner end in said socket and connections between the shorter arm of the float lever and the strut whereby the strut may be moved from its seat in the socket by the elevation of the shorter arm to permit the valve to open and may be moved toward its seat in the socket by the depression of said arm to partially close the valve, the abutment being arranged to bear on the outer end of the strut and exert a final valve-closing pressure thereon.

3. A ball cock comprising a casing having a valve chamber, an inlet at the inner end of the chamber, a valve seat surrounding the inlet, an outlet communicating with the inner portion of the valve chamber, a plunger valve movable in the chamber and having a valve face at its inner end adapted to abut against said seat, and composed of a rigid portion and an elastic portion normally projecting therefrom, said valve having an outwardly facing centrally located socket, a float lever fulcrumed on the casing and having longer and shorter arms and an abutment between said arms in close proximity to the fulcrum, a strut seated at its inner end in said socket, and connections between the shorter arm of the float lever and the strut whereby the strut may be moved from its seat in the socket by the elevation of the shorter arm to permit the valve to open, and may be moved toward its seat in the socket by the depression of said arm to partially close the valve, the abutment being arranged to bear on the outer end of the strut and exert a final valve-closing pressure thereon, said pressure compressing the elastic portion of the valve face.

4. A ball cock comprising a casing having a valve chamber comprising a cylindrical portion which is open at one end of the casing, an inlet at the inner end of the chamber, an annular valve seat surrounding the inlet, an outlet communicating with the inner portion of the valve chamber, ears projecting from the outer end of the valve casing, a cylindrical plunger valve movable in said cylindrical portion and having a face at its inner end adapted to abut against the valve seat and a recess in its outer end terminating in a centrally located semispherical socket, a float lever fulcrumed to said ears and having a cam-shaped abutment above its fulcrum and a bifurcated shorter arm, the branches of which are connected by a pivot stud and by a retaining pin extending across the space between the said branches, a strut having a semispherical inner end seated in said socket, and a recess the inner end of which bears on said pivot stud and is adapted to turn thereon, the outer portion of said strut projecting outwardly from said stud over the pivot of the float lever, and being formed to bear on said abutment when the float lever is raised to its valve-closing position, the strut being confined in engagement with the stud by the said retaining pin.

In testimony whereof I have affixed my signature, in presence of two witnesses.

CHARLES H. ELLIS.

Witnesses:
A. W. HARRISON,
P. W. PEZZETTI.

---

Copies of this patent may be obtained for five cents each, by addressing the "Commissioner of Patents, Washington, D. C."